United States Patent [19]
Silfvast

[11] Patent Number: 6,057,829
[45] Date of Patent: May 2, 2000

[54] COMPUTER-MIRRORED PANEL INPUT DEVICE

[75] Inventor: Scott W. Silfvast, LaHonda, Calif.

[73] Assignee: Euphonix, Inc., Palo Alto, Calif.

[21] Appl. No.: 08/912,384

[22] Filed: Aug. 18, 1997

Related U.S. Application Data

[63] Continuation of application No. 08/371,462, Jan. 11, 1995, which is a continuation of application No. 08/080,296, Jun. 21, 1993.

[51] Int. Cl.[7] .................................................. G09G 5/00
[52] U.S. Cl. ............................................................ 345/156
[58] Field of Search ..................................... 345/156, 157, 345/172, 173, 184; 364/188, 514; 381/119, 117; 395/978, 159, 326, 334, 354

[56] References Cited

U.S. PATENT DOCUMENTS

| | | | |
|---|---|---|---|
| 5,060,272 | 10/1991 | Suzuki | 381/119 |
| 5,212,733 | 5/1993 | DeVitt et al. | 381/119 |
| 5,243,513 | 9/1993 | Peters | 364/188 |
| 5,257,317 | 10/1993 | Stavrou | 381/119 |
| 5,299,267 | 3/1994 | Nakamura | 381/119 |
| 5,327,160 | 7/1994 | Asher | 345/156 |

*Primary Examiner*—Richard A. Hjerpe
*Assistant Examiner*—Ronald Laneau
*Attorney, Agent, or Firm*—Gardere & Wynne, L.L.P.; Sanford E. Warren, Jr.; Daniel J. Chalker

[57] ABSTRACT

A control panel for digital input having multiple rotary knobs without absolute minimum and maximum settings feeds knob position information back to an operator by providing a display of the knobs with position indicators. The display is updated according to real adjustment of the knobs. This arrangement allows the knobs to be assigned to different inputs and the apparent positions of the knobs to be changed without requiring moving the real knobs. In a preferred embodiment the control system is applied to an audio mixer panel.

22 Claims, 6 Drawing Sheets

COMPUTER-MIRRORED PANEL INPUT DEVICE

This application is a continuation of application Ser. No. 08/371,462, filed Jan. 11, 1995, which is a continuation of application Ser. No. 08/080,296, filed Jun. 21, 1993.

FIELD OF THE INVENTION

The present invention is in the area of instruments and systems for managing and mixing audio input for production purposes, such as recordings, and pertains particularly to input actuators and means for resetting same.

BACKGROUND OF THE INVENTION

Audio production for television, video, film, and recorded music sales is a large and growing enterprise, and is the foundation of much of the entertainment industry. Automation in the form of computerization is becoming more and more important as the basis of technical advances in this industry, to provide ability to mix and process more sophisticated and more voluminous audio input, and to provide more flexibility in output. Computerization is also seen as a requirement for cost-effective competition. Manual instruments, systems, and techniques are, by comparison, increasingly more expensive to use.

The basic instrument of audio production is the production mixing console, a workstation presenting an interface to a sound engineer through which he or she may condition multiple channels of audio input, and mix the conditioned results into mono or stereo outputs for direct broadcast or for recording. A production mixing console, hereinafter a mixer, typically presents arrays of input devices, such as switches, knobs, and "faders", for an engineer to set to condition and route audio signals. A fader is typically a slide rheostat through which an amplitude may be adjusted as a result of the linear position of the input lever relative to a track.

Mixers typically route audio input signals to individual channels, and each such channel has a repetitive layout of switches, knobs, and faders. For example, a single channel can have more than one input, such as a microphone input and an input from an instrument, a group of instruments, or a tape. Using the controls on a mixer an engineer can select microphone, line, and tape inputs, route the inputs to signal conditioning devices like faders and equalizers, and mix and route the output from the conditioning devices as well. There is typically a selective ability to monitor audio signals, such as by headphones, and often a microphone for talkback by the sound engineer operating the console.

Audio mixing, especially with digital techniques and computer control, is historically a rather recent development. When rock-and-roll music was first introduced there was no such device as a mixer. In the fifties, recording was done by direct input. Modern mixing was initiated about the time of the appearance of the Beatles, and the first units were highly individualistic. Through the sixties and early seventies direct audio mixers continued to be developed, and continued to be relatively small units with a few channels and were very unique in layout. In the mid-seventies standards began to appear, especially relative to layout of switches, rotary potentiometers, and faders. With a standard layout it became possible for a sound engineer to go from one studio to another, and take over the functions comfortably.

In the early development and well into the late seventies, mixers were completely manual. The audio signals were routed to the mixer, and directly through the switches, pots, and faders. As a result, there were some definite limitations and problems. For example, with the audio signals routed directly through the switching and signal processing devices, it was necessary that heavy duty, low noise devices be developed. Without ultra-high quality devices, contacts, rheostat slides, and the like produce unwanted clicks and other noises that are incorporated into the audio signals.

In answer to some of the problems of direct-audio mixing consoles, some manufacturers have developed digital systems, wherein the input devices on the console do not directly control audio processing equipment, but instead provide digital input, which may be manipulated and saved by the system, and used indirectly to control other devices that process audio signals.

FIG. 1 is an isometric view of a system 11 developed by Euphonix, Inc. of Palo Alto, Calif. for applying the power of digital techniques to audio processing and mixing. In this system console 13 is almost entirely digital, and all audio processing is accomplished in an audio tower 15.

FIG. 2 is an illustration of a pattern 17 of input devices, such as knobs, slide rheostats, and so forth, on the front panel of the console of FIG. 1. The purpose of FIG. 2 is to illustrate the density of input devices and position indicators, which pretty much cover the console surface, being arranged in channels and blocks of like devices. These input devices provide digital position signals which are manipulated and stored, and used to compose and send digital signals to digitally controllable audio processing and mixing devices in the audio tower.

The move to digital systems has provided a very important feature for audio engineers, that was simply not before available. When an engineer has a console set for a particular purpose, say a particular musical group doing a particular sort of music, he or she invariably encounters the situation where a previous complete setting is desired. Before the advent of digital systems, the only answer was to make notes, mental and otherwise, of settings, and then reset all of the input devices on the board from memory and the notes.

With the advent of digital systems, a computer associated with the system can remember the setting of every knob, slide switch, and pushbutton. It is only necessary to provide a signal to store all current settings (often called a "snapshot" in the art). Then, at a later time, another signal can retrieve the previous settings from memory storage. The way the computerized system "gives back" the information, though, presents new problems in the art.

One difficulty is related to the nature of the digital input devices, particularly knobs. In conventional, directly-coupled systems, knobs operate rotary potentiometers. An example is a one-turn pot. The pot had a minimum and a maximum input setting, and could be set at any position in between, the resistance of the pot being proportional to the setting position setting. in a digital system a knob is typically sensed by a shaft encoder, and the "real" setting is determined by recording the amount of rotary movement from an assigned base, or zero, position. Such a rotary input can correctly be called an infinite knob, in that there is no minimum or maximum physical setting. A new base position may be assigned at any time. Likewise, a new position relative to "zero" may be assigned at any time.

FIG. 3 is a block diagram illustrating the general situation with a series of digital input knobs 19, 21, and 23, representing a set of knobs 1-n. Shaft encoders 25, 27, and 29 respectively "read" the rotation of knobs 19, 21, and 23, and present the magnitude and direction of rotary movement to a CPU 31, configured to calculate and store values in a series of operating registers 33 in RAM 39. The values in operating registers 33 are used by the digital system to drive signal processors that actually alter and mix the audio signals input to the system. It will be apparent to one with skill in the art, as well, that there may be multiple processors, various kinds of bus devices such as bus 30, and other arrangements of digital elements for computation and communication, which are known in the art.

The encoders read discrete increments of rotary motion in some number of increments of revolution, the greater the number the greater the resolution. For example, a particular encoder may be configured to report 256 increments per revolution.

The setting for each knob is determined in operating registers 33 by adding and subtracting the discrete increments of rotation. A setting (snapshot) of the series of knobs 1–n is made on signal by the engineer operating the board by storing the immediate value of operating registers 33 in another series of registers 35 for later retrieval and use, and then continuing to update the immediate registers. Any number of snapshots may be made and stored, depending on the configuration of the system, in separate memory register locations, with the snapshots having names or numbers for identification in retrieval.

In the digital system, when one wishes to retrieve a snapshot, to set up the board according to a previously stored global setting, a signal is given with the name or number of the snapshot to be restored, and the stored setting (such as the values in registers 35) is retrieved and substituted for the values in operating registers 33.

Once an engineer recalls a setting, and all of the operating registers are reset to the recalled value, representing knob positions, the idea is to proceed from that point making new adjustments in the settings to account for changing situations and conditions, but now a serious problem emerges.

The problem is, that in the older, directly-coupled system, there were absolute minimum and maximum positions. A knob, then, could be imprinted with an indicator line or arrow to align with an indicator on the panel, to tell an engineer at a glance the absolute setting. The knobs in the digital case are not directly coupled, however, and the recalling of a setting provides the desired operating values in the operating registers, but does nothing to indicate a relative knob position. The knobs are not reset, so the engineer is deprived of critical feedback.

There are several ways this problem might be solved. One solution known to the inventors is to have absolute indicators on the knobs and the panel, and to provide motor drives for the knobs, so when a snapshot is recalled, the recalled values are used to operate the motors to drive the knobs to the recalled setting. Then the engineer can operate the board from the new position just as is done in the older, directly-coupled systems.

Considering the density of operating devices as shown in FIG. 2, one can easily understand the difficulty of the motor-drive solution. The motor drives are relatively bulky, the drives are expensive, having to be coupled in a manner, such as by clutches, to allow manual movement of the knobs after resetting, and the density of control and power wiring behind the panel is typically more than doubled. Heat generation is increased, and system reliability is adversely affected.

Another possible solution is shown in FIG. 4A. In this case, knob 37 has a series of built-in LEDs, such as LED 40, around the periphery, and an absolute indicator 41 on the panel. When a snapshot is recalled, the new setting value is used to light the one appropriate LED in the knob that most closely shows the new setting relative to absolute indicator 41. If the recalled value for this particular knob indicates 50% of full value, for example, the system will light LED 43, 180 degrees from the absolute indicator. The knob is then effectively "reset" just as though driven to a new position by a motor. The engineer knows which direction of rotation increases setting value, so that is not a problem.

The LEDs in the knob solution suffers from the density problem as well. The panel density dictates that knobs are relatively small, and there is a low limit to the number of LEDs that may be installed in one knob, providing poor resolution. Also, there is the problem of selectively lighting the LEDs in the rotary knob.

FIG. 4B shows a variation of the solution of FIG. 4A. In this case, knob 45 has an absolute indicator 47, and the LEDs are arranged in a circle around the knob, such as LED 49. When a setting is recalled, the appropriate LED is lighted indicating the setting. For example, if the recalled setting is 50% of full value, LED 51 may be lighted.

The solution of FIG. 4B relieves the resolution problem of that of FIG. 4A, but not by much. In addition, there must be some reliable means of keeping track of the absolute position of knob 45, and the recalled settings force the engineer to operate from a new absolute position after each recall.

What is needed is a means of providing the new setting positions to the engineer quickly and reliably without sacrificing resolution or increasing wiring density and complexity.

SUMMARY OF THE INVENTION

In a preferred embodiment a system for digital input and virtual feedback is provided comprising manually operable input means for providing a digital signal relative to movement of the input means, display means for displaying a virtual image of the manually operable input means including position indication, CPU means for managing operation of the system, and for receiving, processing, and routing digital signals from the input means and driving the display means, and memory means for storing data and control routines for use by said CPU means. The CPU means is configured to drive the display means to provide visual position indication on the virtual image corresponding to movement of the input means, and to provide the digital signals to digitally controllable devices.

The invention is particularly applicable to a digital audio mixer panel, and in that aspect allows resetting of inputs for various control devices without requiring manual resetting of the input devices. In another aspect input means is provided to selectively reassign one set of physical input devices, such a rotary knobs, to various different controlled devices. The presentation of the input devices as virtual images with position indicators allows the real input panel to remain free of resettable position indicators, and input device position to be reliably indicated with excellent resolution.

DESCRIPTION OF THE PREFERRED EMBODIMENTS

Figure 5A:
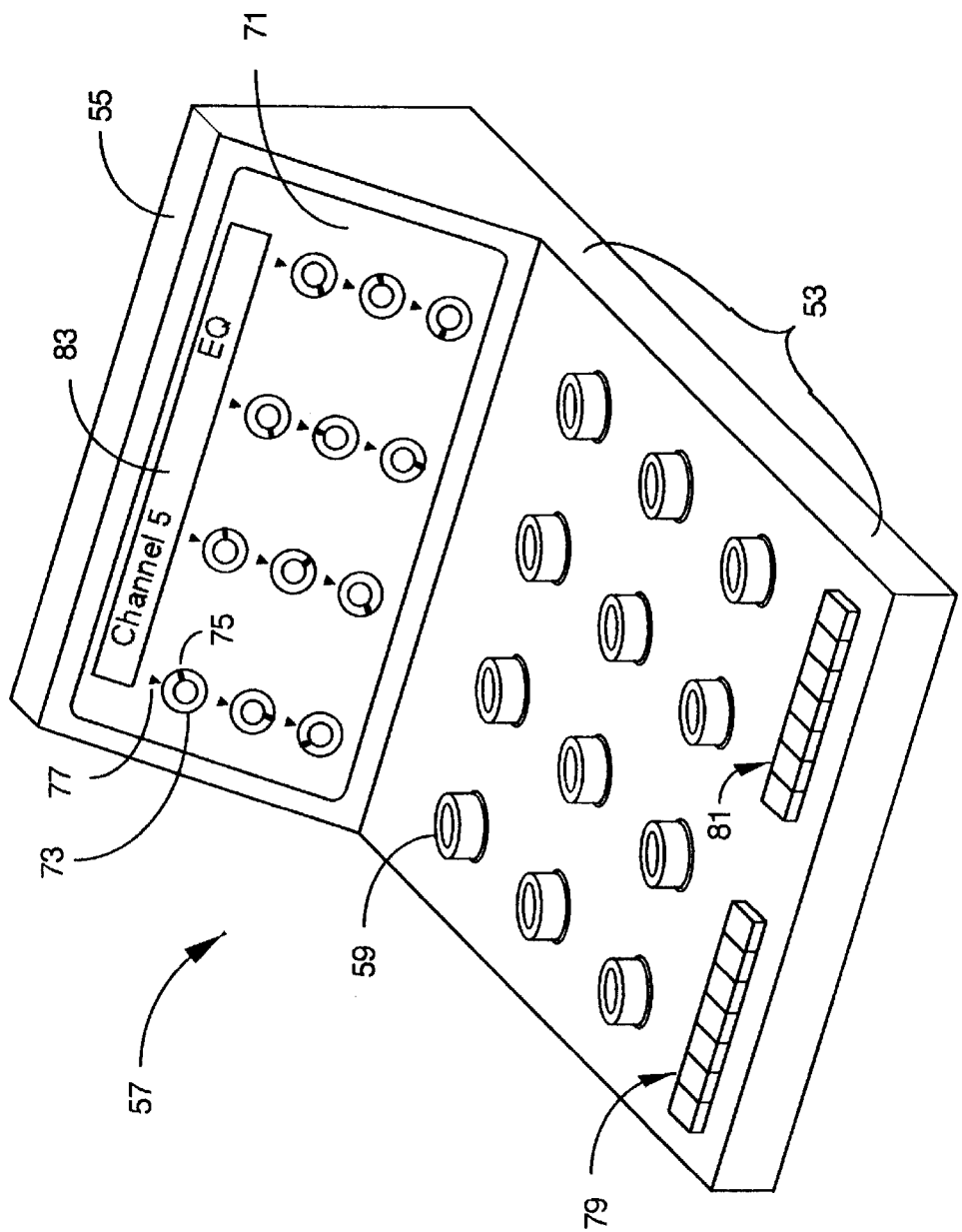
FIG. 5A is an isometric view of an input panel with a display according to an embodiment of the invention.

FIG. 5A shows an array of rotary knobs 53 adjacent a flat panel display 55 in a system 57 according to an embodiment of the present invention for providing digital signals to control audio mixing and processing equipment. The audio mixing and processing elements are not shown, and may be in a separate enclosure at some distance, and addressed by digital communication lines, such as a serial communication link. The display need not be a flat panel display, but such a display lends itself most conveniently to embodiments of the invention. In the example shown in FIG. 5A knobs 59 are arranged in a rectangular array 4 wide and three deep, for a total of 12 physical knobs.

Figure 3:
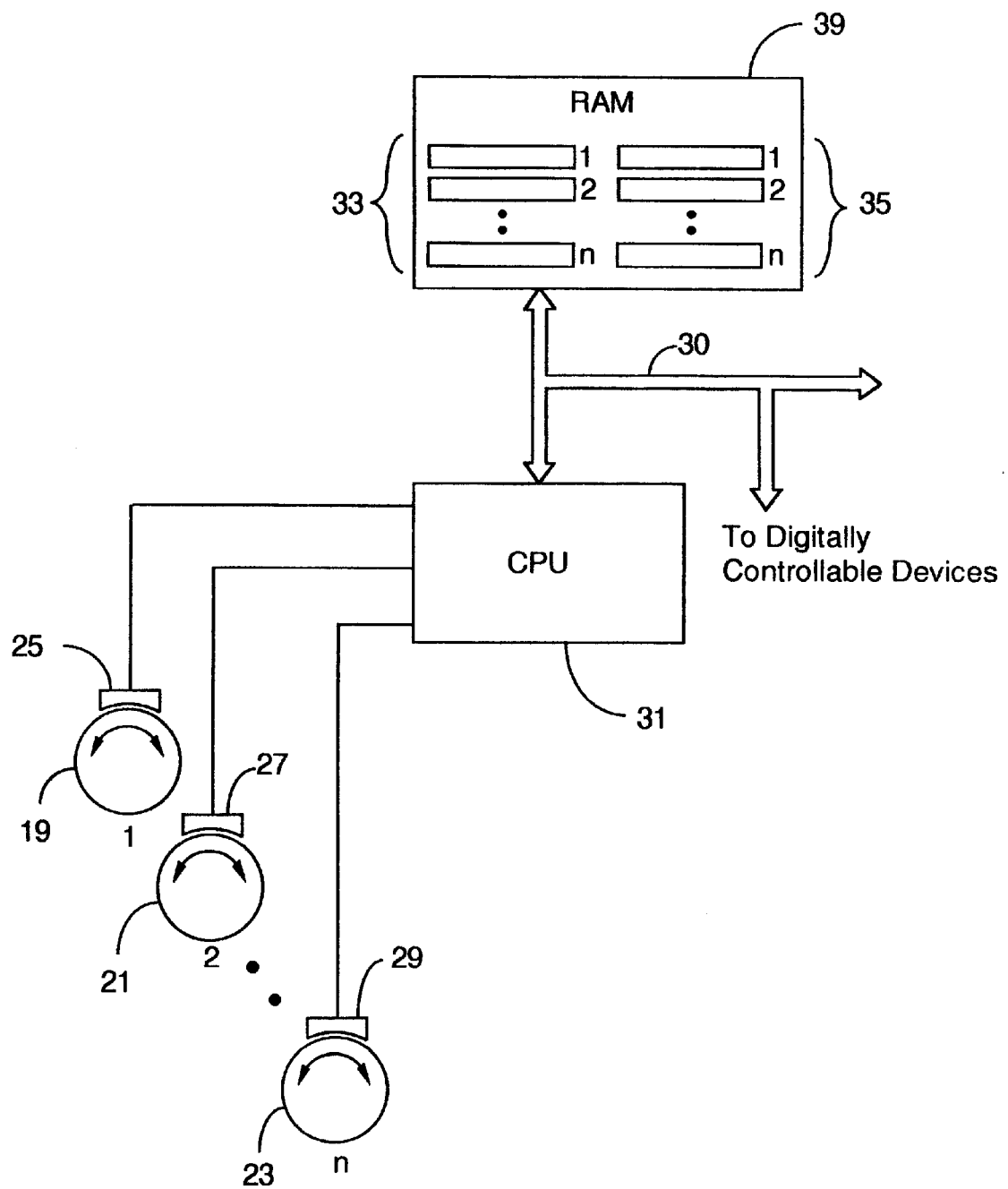
FIG. 3 is a block diagram illustrating knob input operations in a digital console system.
Figure 4A:
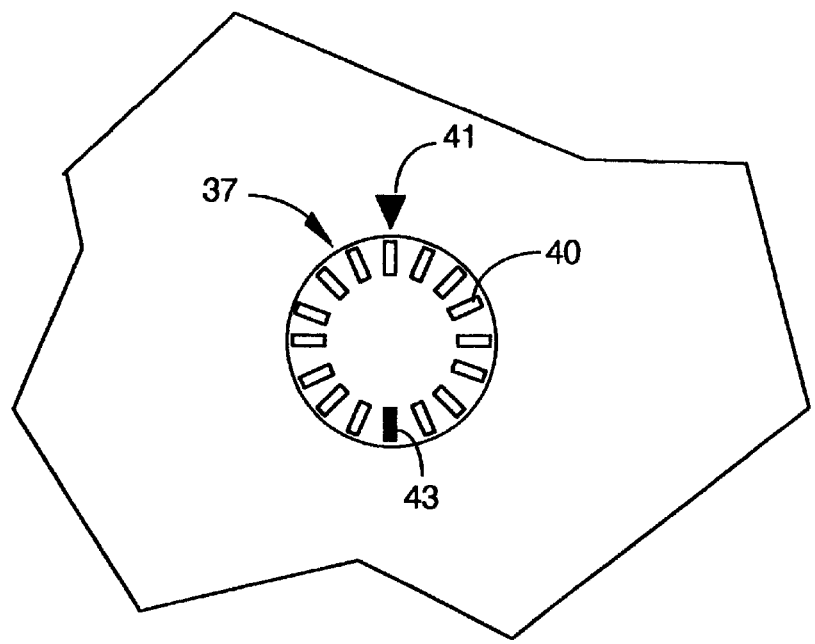
FIG. 4A shows one possible solution to the problem of knob position in snapshot recall.
Figure 4B:
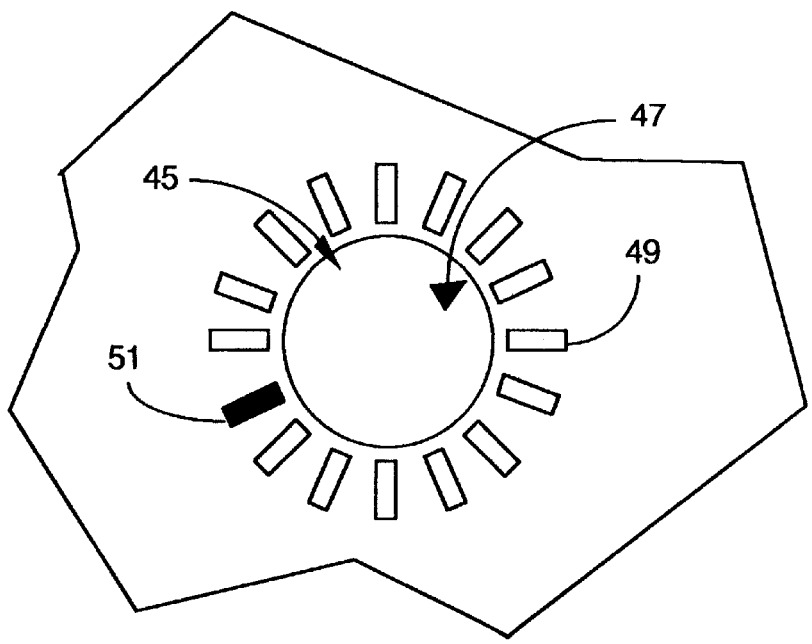
FIG. 4B shows a variation to the solution of FIG. 4A.
Figure 5B:
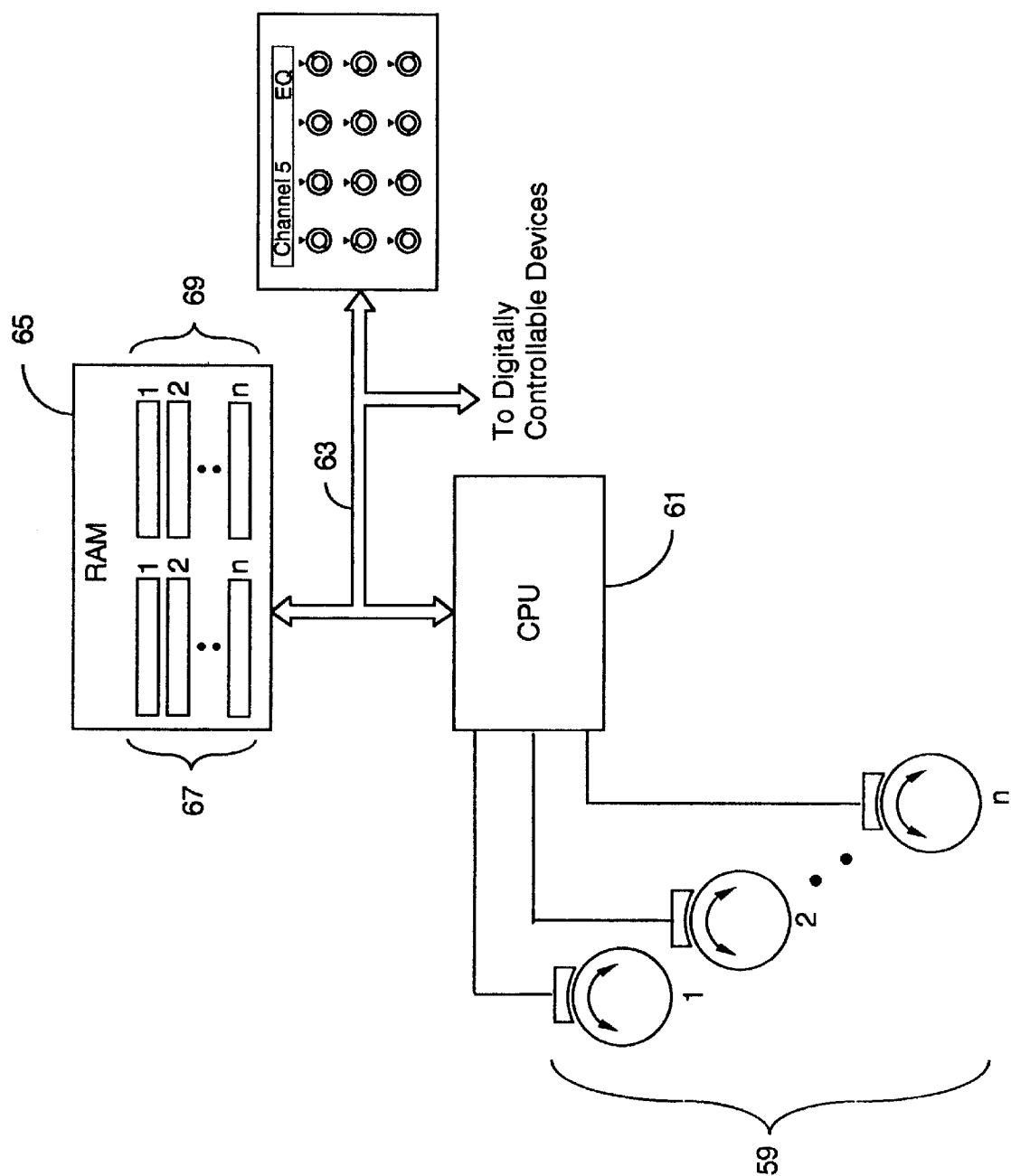
FIG. 5B is a block diagram of the input panel of FIG. 5A.

In the apparatus of FIG. 5A the knobs are digital inputs, typically implemented with shaft encoders, as in FIG. 3. FIG. 5B is a block diagram showing the general electronic arrangement of elements in system 57. Knobs 59 feed rotary information to CPU 61 which communicates on a bus 63 to RAM 65 to maintain position setting values for knobs 59 in operating registers 67. Snapshots signalled cause position settings in registers 67 to be stored in separate registers, such as registers 69, identified for later retrieval.

The operating registers are used in the system to drive digitally responsive processing and mixing devices to accomplish the purposes of the audio engineer, which devices may, as described above, be located in a separate enclosure. In addition, the values of the operating registers are used in conjunction with stored control routines and data to drive display panel 55 to display an array 71 of virtual rotary knobs corresponding on a one-to-one positional basis to physical rotary knob array 53.

In this unique solution to the position feedback problem described above, the operator manipulates physical knobs such as knob 59 in array 53, and the computerized system displays virtual corresponding knobs in array 71. The physical knobs need not have, and in this embodiment, do not have, indicators, either on the knobs or on the panel. Absolute indicators are indicated on both the virtual panel and knobs in the display.

This arrangement allows the physical console to remain uncluttered, both as to legends and indicators. All legends and indicators are shown in the display, where they may be updated without having to manipulate any real hardware.

The real time correspondence of the real and virtual knobs is such that as an operator manipulates (rotates) a real knob, such as upper left knob 59 (FIG. 5A), the geometrically corresponding knob 73 in the display is seen to rotate by a like amount, with a knob position indicator 75 changing position in apparently real time. As the virtual knobs are, in this embodiment, implemented as a full plan view (no shadowing), it is actually only necessary to move the knob position indicators to indicate knob rotation. Panel indicators, such as indicator 77 for virtual knob 73, do not move.

In another embodiment there are no real input devices at all, and the virtual devices are manipulated by known methods of computer screen input, such as pointer devices and touch-sensitive screens. This implementation is seen to be less preferred in the art, because most audio engineers have developed a feel for "playing" the real devices. The embodiment described above, with real devices for input, and virtual devices for feedback, retains the feel for the operating engineer.

In an alternative embodiment, the real and virtual knobs are color coded to increase the comfort of visual correlation for the operator engineer. The coding can be by any of a number of schemes, with the virtual knob carrying the same color as the real. In other embodiments, knob size, shape, and other visual indicators might be used as well.

The invention is applicable as well to other than knobs, although all the advantages of the replication of knob inputs are not realized. For example, an array of pushbuttons may be replicated, or pushbuttons along with knobs or other input devices, with the state of the pushbutton switches indicated in the virtual array. This allows for use of real pushbuttons without internal LEDs to indicate state, and for snapshots to be retrieved for pushbutton states as well as knob positions.

Slide rheostats (faders) may also be replicated, but this implementation suffers from the drawback that the actual physical faders will be in a different position than the virtual after retrieval of a snapshot. In this case the operator has to move the physical faders to the retrieved indicated position, and the equivalence may be signalled with visual, auditory, or even sensual indication.

The virtual replication of input indicators has another dimension beyond solving the feedback problem for snapshot retrieval. That is that the correspondence of input devices to audio processing and mixing equipment may be selectable.

Figure 1:
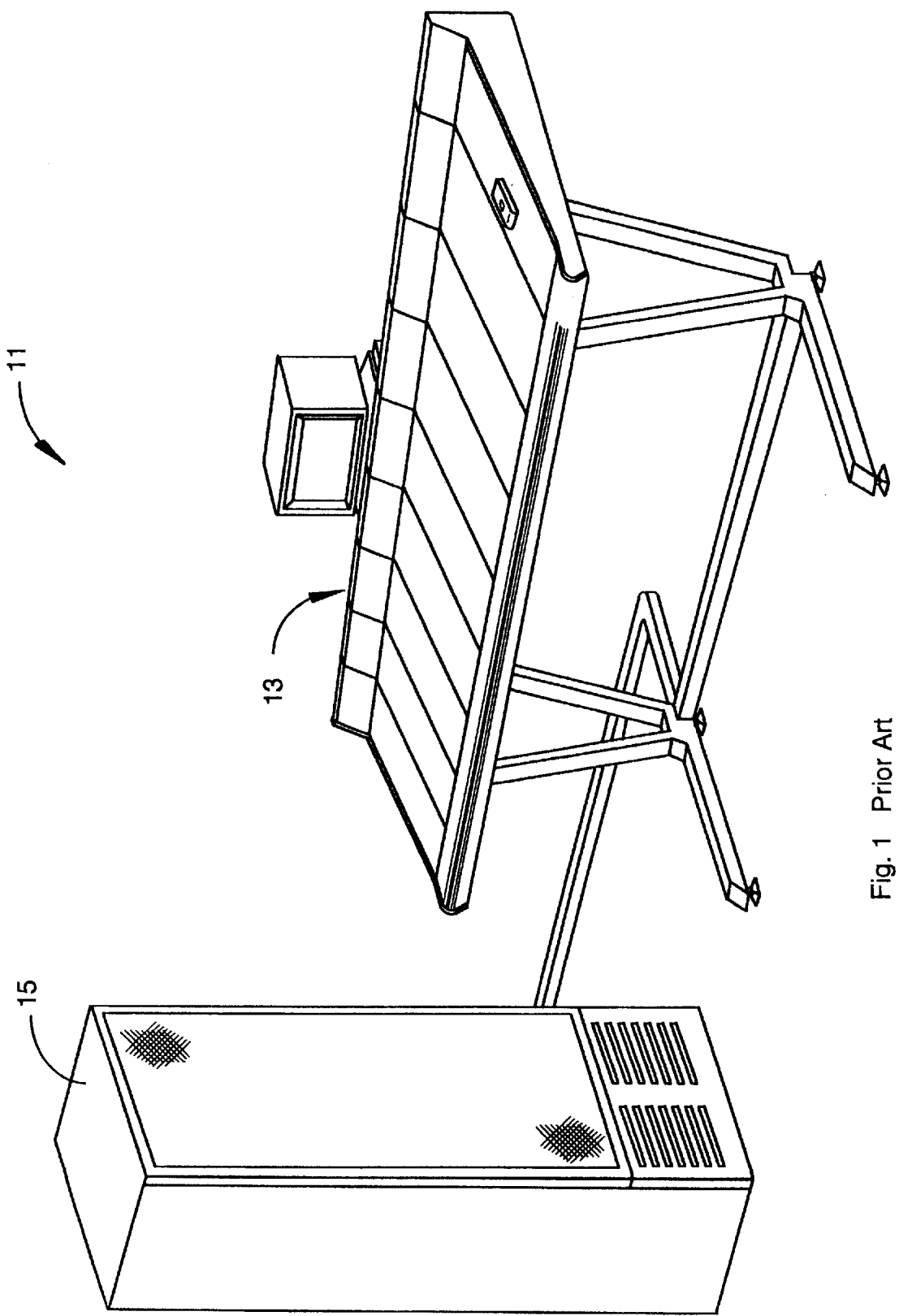
FIG. 1 is an isometric view of a digital audio mixing console in the prior art.
Figure 2:
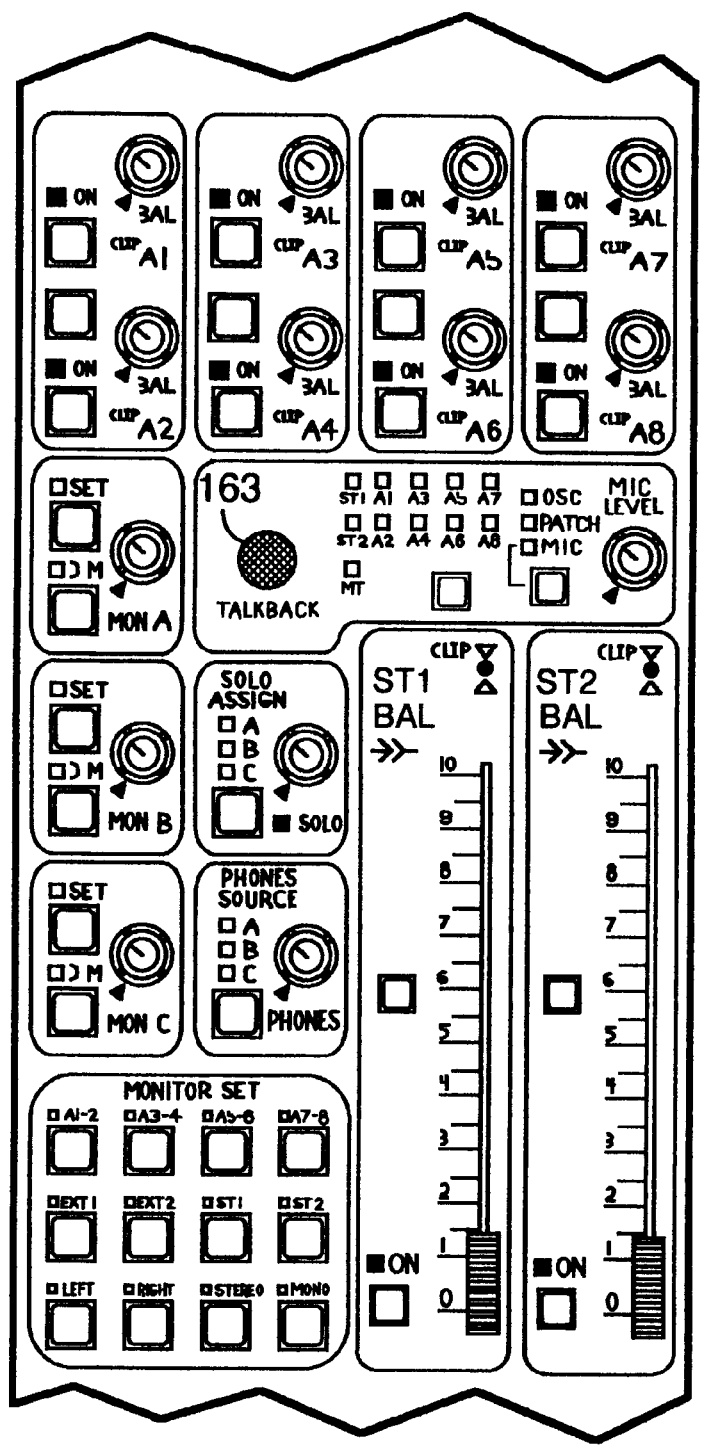
FIG. 2 is a partial view of input operating devices on the console of FIG. 1.

In an audio mixing console as shown in FIG. 1, there are typically multiple channels assigned by such as patch cords to individual or grouped audio inputs. For example, in an application for an instrumental group, lead guitar may be assigned to Channel 1, base to Channel 2, keyboard to channel 3, etc. Each of the channels typically has a similar array of input devices assigned to particular processing devices. For example, a single channel may have a one or more bar graph meters assignable to various sources, an input amplifier controlled by certain input devices, filters, one or more faders, and other associated processing and mixing equipment.

In the embodiment shown in FIG. 5A, the one set of physical input devices may be assigned selectively to different channels by pressing one of attention keys 79, and to a function within a channel by pressing one of attention keys 81. When selection is made, the display changes to show the "current" setting for the particular function in the particular channel selected, and a caption or other legend, such as caption 83, changes to indicate the channel and function selected. In this case the selection of Channel 5 EQ (for equalizer) is shown.

By this feature of the invention, an entire sophisticated mixer console may be implemented by a single array of input devices, and a single display, while still retaining all of the necessary feedback ability and the physical feel of manual manipulation for "playing" the board.

It will be apparent to those with skill in the art that there are many alterations that may be made without departing from the spirit and scope of the invention. For example, there are many different ways that input devices may be grouped in a real panel, and the number may change for many reasons from just one to a much larger number. The nature of both the input devices and the virtual displays of them may also be done in a wide variety of ways. Specifically, different manufacturers and developers favor different groupings of input devices, generally duplicated in a channel scheme, but any such grouping is amenable to the separation of physical manipulation and visual feedback as described above for embodiments of the invention.

What is claimed is:

1. A system for digital input and virtual feedback comprising:

manually operable input means for providing a digital signal relative to movement of the manually operable input means;

display means for displaying a virtual image of the manually operable input means including a visual position indication of the manually operable input means;

CPU means for managing operation of the system, receiving, processing and routing digital signals from the manually operable input means and driving the display means to provide the virtual image and the visual position indication corresponding to movement of the manually operable input means and providing the digital signals to digitally controllable devices and storing a snapshot of one or more real-time operating values associated with the manually operable input means in response to a first user signal, the snapshot being stored in a separate assigned series of memory registers, representing the position of the manually operable input means at the time the first user signal is received, to retrieve the snapshot in response to a second user signal, and to display the positions of the manually operable input means on the virtual image according to the snapshot data retrieved; and memory means for storing data and control routines for use by the CPU means.

2. A system as recited in claim 1 further comprising assignment means for assigning the manually operable input means to control separate ones and groups of the audio signal processors.

3. A system as recited in claim 2 wherein the assignment of the manually operable input means to control separate ones and groups of the audio signal processors is indicated by a legend on the display means.

4. A system as recited in claim 1 wherein the manually operable input means comprises multiple manually operable input means, the virtual image comprises multiple virtual images corresponding to the multiple manually operable input means on a one-to-one basis, wherein the one or more real-time operating values are digital values representing a position of the multiple manually operable input means relative to an assigned base position, and wherein the CPU means further comprises updating the real-time operating values according to signals received from the multiple manually operable input means as the multiple manually operable input means are adjusted.

5. A system as recited in claim 1 wherein the manually operable input means comprise a rotary knob having one or more shaft encoders, the display means comprises a flat panel display, and the virtual image comprises a plan view of the rotary knob having one or more position indicators on and adjacent to the plan view of the rotary knob.

6. A system as recited in claim 1 wherein the system is a system for providing digital signals to control audio signal processors in and audio mixer having multiple input channels for audio signals.

7. An audio mix controller comprising:

manually operable input means for providing digital signals relative to movement of the manually operable input means:

display means for displaying virtual images of the manually operable input means including a visual position indication of the manually operable input means:

CPU means for managing operation of the system, receiving, processing and routing digital signals from the manually operable input means, and driving the display means to provide the virtual image and the visual position indication corresponding to movement of the manually operable input means and to provide the digital signals to digitally controllable devices, and storing a snapshot of the one or more real-time operating values associated with the manually operable input means in response to a first user signal, the snapshot being stored in a separate assigned series of memory registers, representing the position of the manually operable input means at the time the first user signal is received, to retrieve the snapshot in response to a second user signal, and to display the positions of the manually operable input means on the virtual image according to the snapshot data retrieved;

memory means for storing data and control routines for use by the CPU means; and digitally controllable audio signal processing and mixing means for receiving, processing and mixing audio signals from the CPU means.

8. An audio mix controller as in claim 7 further comprising assignment means for assigning the manually operable input means to control separate ones and groups of the audio signal processors.

9. An audio mix controller as in claim 8 wherein the assignment of the manually operable input means to control separate ones and groups of the audio signal processors is indicated by a legend on the display means.

10. An audio mix controller as recited in claim 7 wherein the manually operable input means comprises multiple manually operable input means, the virtual image comprises multiple virtual images corresponding to the multiple manually operable input means on a one-to-one basis, wherein the one or more real-time operating values are digital values representing a position of the multiple manually operable input means relative to an assigned base position, and wherein the CPU means further comprises updating the real-time operating values according to signals received from the multiple manually operable input means as the multiple manually operable input means are adjusted.

11. An audio mix controller as recited in claim 7 wherein the manually operable input means comprise a rotary knob having one or more shaft encoders, the display means comprises a flat panel display, and the virtual image comprises a plan view of the rotary knob having one or more position indicators on and adjacent to the plan view of the rotary knob.

12. A audio mix controller as recited in claim 7 wherein the system is a system for providing digital signals to control audio signal processors in and audio mixer having multiple input channels for audio signals.

13. A method for displaying a virtual image and a position of a manually adjustable digital input device in a control system, comprising the steps of:

storing a snapshot of one or more digital values indicating the position of the manually adjustable digital input device in an operating register in response to a first user signal;

retrieving the snapshot in response to a second user signal;

displaying the virtual image and the position of the manually adjustable digital input device on a display according to the retrieved snapshot;

amending the snapshot of the one or more digital values according to movement of the manually adjustable digital input device; and updating the position of the virtual image according to the amended snapshot of the one or more digital values.

14. An apparatus for providing visual simulated, realistic feedback to a user that corresponds to a user-input at a mixer, comprising:
(a) one or more input devices providing one or more independent signals to the mixer relative to movement of the one or more input devices;
(b) a display positioned to be observable by the user manipulating the one or more input devices;
(c) a CPU connected to the mixer, the CPU controlling the display and presenting a simulated, realistic image of the mixer and the one or more input devices on the display storing a snapshot of the one or more real-time operating values associated with the one or more input devices in response to a first user signal and retrieving the snapshot in response to a second user signal and displaying the positions of the one or more input devices on the virtual image according to the snapshot data received and updating the simulated, realistic image of the mixer and the one or more input devices in response to movement of the one or more input devices based on the one or more independent signals; and
(d) a communication link coupling the mixer, the display and the CPU.

15. The apparatus as recited in claim 14, further comprising a memory for storing and recalling data and control routines from the CPU.

16. The apparatus as recited in claim 14, wherein the mixer controls are further defined as being rotary knobs having a shaft encoder.

17. The apparatus as recited in claim 14, further comprising an audio signal processor connected to the CPU.

18. The apparatus as recited in claim 14, further comprising an audio mixer panel connected to the CPU.

19. The apparatus as recited in claim 14, wherein the movable portion of the input device comprises a rotary knob, and the indicator of relative position includes a mark on the image of the knob and a reference mark adjacent to the image of the rotary knob.

20. The apparatus as recited in claim 14, wherein the user-operable input apparatus comprises a shaft encoder assembled with the rotary knob, the shaft encoder providing a digital indication of magnitude of rotary movement of the knob.

21. A method for displaying realistic, simulated positional information to a user for one or more mixing controls having a movable portion for varying a signal in a control system, comprising the steps of:
(a) storing a snapshot of one or more digital values in a memory of the control system in response to a first user signal, the one or more digital values indicating magnitude of an input signal associated with the one or more mixing controls;
(b) retrieving the snapshot in response to a second user signal;
(c) displaying a simulated, realistic image of the one or more mixing controls on a video display screen, along with an indication of input magnitude according to the retrieved snapshot;
(d) amending the snapshot of the one or more digital values according to movement of the movable portion of the one or more mixer controls; and
(e) updating the simulated, realistic image of the one or more mixing controls to indicate the actual change of the one or more mixing controls on the video display screen according to the changed digital value in a realistic manner.

22. A computer program embodied on a computer-readable medium for displaying realistic, simulated positional information to a user for one or more mixing controls having a movable portion for varying a signal in a control system, comprising:
(a) logic that stores a snapshot of one or more digital values in a memory of the control system in response to a first user signal, the one or more digital values indicating magnitude of an input signal associated with the one or more mixing controls;
(b) logic the retrieves the snapshot in response to a second user signal:
(c) logic that displays a simulated, realistic image of the one or more mixing controls on a video display screen, along with an indication of input magnitude according to the retrieved snapshot;
(d) logic that amends the snapshot of the one or more digital values according to movement of the movable portion of the one or more mixer controls; and
(e) logic that updates the simulated, realistic image of the one or more mixing controls to indicate the actual change of the one or more mixing controls on the video display screen according to the changed digital value in a realistic manner.

* * * * *